United States Patent [19]
Kleis

[11] 4,049,279
[45] Sept. 20, 1977

[54] CONTROL DEVICES FOR PICK-UP ARMS OF RECORD PLAYERS
[75] Inventor: Gustav Kleis, Lahr, Germany
[73] Assignee: Geratewerk Lahr GmbH, Lahr, Germany
[21] Appl. No.: 734,132
[22] Filed: Oct. 20, 1976
[30] Foreign Application Priority Data
  Oct. 20, 1975  Germany .............................. 2546921
[51] Int. Cl.² ............................................ G11B 17/06
[52] U.S. Cl. ................................................ 274/15 R
[58] Field of Search .................... 274/10 R, 13, 14, 17, 274/23 R

[56]  References Cited
  U.S. PATENT DOCUMENTS
  3,305,238  2/1967  Carlson .............................. 274/10 R
  3,307,851  3/1967  Tourtellot .......................... 274/15 R
  3,311,379  3/1967  Zarm .............................. 274/10 R X Primary Examiner—Charles E. Phillips
Attorney, Agent, or Firm—Fleit & Jacobson

[57]  ABSTRACT

A control device for a pick-up arm of a record player comprises a power take-off element disposed on a vertical spindle of the arm, a planetary gear arrangement comprising a sun wheel and at least one planet wheel in engagement with the sun wheel, and a rotatable support means connected to the sun wheel by a clutch and mounting the planet wheel or wheels. On rotation of the sun wheel the rotatable support means with the planet wheels mounted thereon also rotates until either a planet wheel or a drive wheel fixed to the planet wheel comes into contact with the power take-off element, whereupon the clutch slips and the planet or drive wheel will rotate and, through frictional contact with the power take-off element, will rotate the spindle and thus swivel the pick-up arm. The control device also includes lifting means responsive to rotation of the rotatable support means to raise the pick-up arm before the planet wheel or drive wheel is brought into contact with the power take-off element.

16 Claims, 16 Drawing Figures

CONTROL DEVICES FOR PICK-UP ARMS OF RECORD PLAYERS

BACKGROUND OF THE INVENTION

1. Field of the invention

This invention relates to control devices for pick-up arms of record players.

2. Discussion of the prior art

It is known for a control device for a pick-up arm of a record player, particularly an automatic record player, to include a drive mechanism for moving the pick-up arm and clutch means by means of which the drive mechanism can be connected to or disconnected from the pick-up arm.

In addition to a facility for manual operation, it is desirable for a record player to have means for automatic control of the movements of its pick-up or tone arm. This means in particular that the pick-up arm should be controllable so that it can be set into any desired position. With high quality record players in particular, it is highly desirable that the pick-up arm, after it has been moved to a desired position for playing the record, be disconnected completely from the drive mechanism which produced the movement. This is to ensure that the very small amount of friction produced by the means mounting the pick-up arm during the course of playing is not increased by the drive mechanism remaining coupled to the arms. In addition, great demands are made in high-quality record players on the evenness of the movement of the pick-up arm. It should also be possible to interrupt the movement of the pick-up arm at any time and at any desired point without jerking or "run-on", i.e. movement after the arm should have come to a halt resulting in "overshooting".

There are known control devices in which movement of the pick-up arm by the drive mechanism is forced to run through a specific programmed cycle. Record players incorporating such control devices are on the market. There are also record players on the market which have one or more separate motors for driving the pick-up arm and permit manual, semiautomatic or fully automatic playing of records. However, these known record players do not afford any great evenness in the movement of the pick-up arm. Further, in these record players the tone arm can be stopped at a desired point with only a low degree of accuracy, unless fixed mechanical stops are provided for the purpose, like those which are also known in record players.

Record players with a linear movement of the pick-up arm, i.e. with a linear pick-up arm, are also known, the point of rotation of the arm lying on a linearly moving and therefore not a stationary spindle. In such a record player, with each change of position of the pick-up system the point of rotation of the pick-up arm must be displaced by the amount of this change. The mechanical structure required for this necessitates a precision carriage guide, and substantial expenditure on a linear follower control means is necessary.

SUMMARY OF THE INVENTION

An object of the invention is to provide a control device for the pick-up arm of a record player which moves the pick-up arm with a high degree of accuracy and smoothly to a desired position, and in which the movement can be interrupted or ended at any desired point without jerking or run-on and without the aid of mechanical stops.

The control device of the invention include a power take-off element disposed on a vertical spindle of the pick-up arm. It also includes a gear arrangement, wherein at least one planet wheel is disposed on a rotatable support means, for instance a bar, which is connected by means of a slipping clutch to a sun wheel driven by a drive means in such a way that, when the sun wheel turns, the bar with the planet wheel or wheels is turned with it, up to a point where a planet wheel, or a drive wheel fixedly coupled to it, comes into contact with the power take-off element, as a result of which the clutch slips and the planet wheel, or a drive wheel fixedly coupled to it, is set in rotation about its own axis, and thus drives the power take-off element through frictional contact therewith and sets the pick-up arm in rotary motion about its vertical spindle, and in such a way that the rotary movement of the bar at the same time ensures that the pick-up arm is raised above the record before the planet wheel or drive wheel comes into contact with the power take-off element.

A single planet wheel may be provided which, depending on the desired horizontal direction of swivel of the pick-up arm, is driven by the drive mechanism in the appropriate rotatory sense, or two planet wheels can be provided, a respective one of which being pressed against the power take-off element according to the desired horizontal direction of swivel of the pick-up arm, the directions of rotation of the planet wheels here also being selected according to the desired horizontal directions of swivel of the pick-up arm.

To control lifting of the pick-up arm, there may be disposed on the rotatable support means an actuating element which actuates a lifting device during the rotary movement of the rotatable support means and thus moves the pick-up arm into a lowered or raised position in relation to the record.

The rotatable support means can be in two parts which are nonrotatably connected to each other, one part carrying the planet wheel(s) while the other part carries the actuating element for control of the vertical movement of the pick-up arm. It is also possible for the rotatable support means to comprise a single member.

The planet wheel(s) can be pressed against an outer circular periphery of the power take-off element or against an inner periphery provided on the power take-off element.

When the direction of swivel of the pick-up arm is reversed there is always, with the above-described structure, a temporary lowering of the pick-up arm onto the record. In order to be able to ensure free manipulation of the swivelling movement of the pick-up arm, means may be provided to avoid the brief lowering of the pick-up arm during the reversal of the direction of swivel. Such means may comprise either a magnetically actuated pawl acting upon the lifting device, or a magnetically actuated locking device which stops rotation of the rotatable support means while a planet wheel remains in frictional contact with the power take-off element.

The actuating element disposed on the rotatable support means for controlling the vertical movement of the pick-up arm can be in the form of a control surface with surface areas having various levels and inclination, which surface is tracked or followed by the lifting devices which is in the form of a lifting rod; and in a preferred form this tracking movement is transmitted to the pick-up arm. The lifting rod can be pressed by spring pressure onto the control surface.

The rotatable support means can be provided with actuating parts for electrical switches which produce appropriate functioning of the drive mechanism.

A positioning device indicating which recognises specific positions of the pick-up arm can also be provided.

The following are advantages resulting from the features of the invention described above:

The control device is universally usable, compact and self-contained. The drive mechanism and also the switching elements which are used can be combined as one unit in the manufacturing process. All movements of the pick-up arm are carried out with one drive motor. The pick-up arm is raised from the record before it makes a horizontal swivelling movement. This results in the optimum of operating possibilities for the pick-up arm being controlled. The mounting characteristics of the pick-up arm are not adversely affected. The pick-up arm can be stopped at or moved to a desired point with the greatest accuracy, without fixed mechanical stops being necessary for the purpose, since the planet wheel is set in rotary motion only when it is pressed with a certain contact pressure against the power take-off element. This contact pressure is provided by the friction torque of the slipping clutch. By means of the drive mechanism, which is, for example, in the form of a single motor, the planet wheel can be stopped in a position where it is pressed against the power take-off element, so that horizontal swivelling movement of the pick-up arm is ended, while the planet wheel is still pressed against the power take-off element. Only after after this does uncoupling of the planet wheel takes place. As a result uncoupling of the planet wheel from the power take-off element is well-defined and free from play. This is why no disturbing moment is transmitted to the pickup arm either during coupling of the planet wheel to the power take-off element or during uncoupling from it. Since only a few frictionally moved parts are provided, only a small amount of noise is developed.

BRIEF DESCRIPTION OF THE DRAWINGS

The invention will now be described in greater detail, by way of example, with reference to the accompanying drawings, which show preferred embodiments of the invention, and in which.

DETAILED DESCRIPTION OF THE PREFERRED EMBODIMENTS

In the figures of the drawings, the same parts or parts having the same function are identified throughout by the same reference symbols.

The figures show that the illustrated control devices each comprise a vertical pick-up arm spindle 1 which is connected by means of a coupling element 28 to a power take-off element 2. The coupling element 28 can be omitted, in which case the power take-off element 2 would be mounted directly on the spindle 1. A position indicating element 27 is rigidly connected to the spindle 1. In FIGS. 1 to 6 drive wheels 3, 4 are disposed on a rotatable bar 7. Shafts 5, 6 which project through the bar 7 serve to support drive wheels 3, 4. Lower parts of the shafts 5, 6 carry planet wheels 17, 18 which are preferably, as shown, toothed wheels. The planet wheels 17, 18 are connected to be driven by a motor 24 by way of a sun wheel 11, also preferably a toothed wheel, a bevel gear 20, a toothed wheel 21, and a worm gear 22, which is carried by a shaft 23 of the motor 24. The bevel gear 20 and the toothed wheel 21 are carried on a shaft 19.

Figure 1:
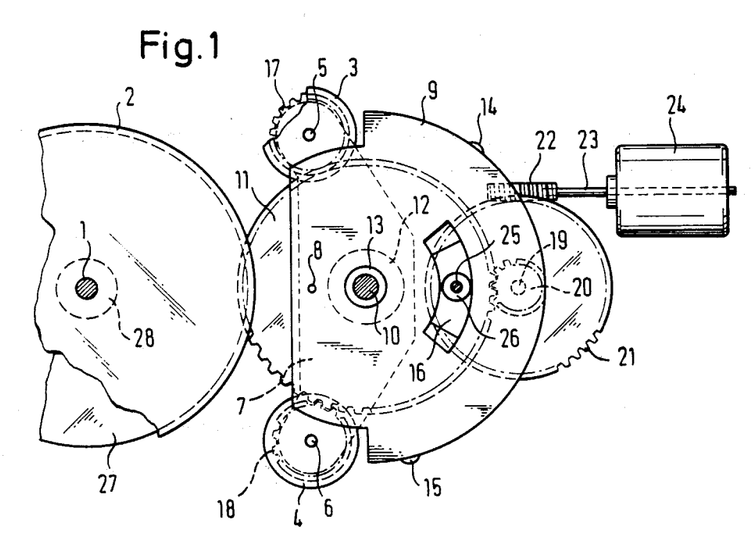
FIG. 1 is a plan view of a first embodiment.
Figure 2:
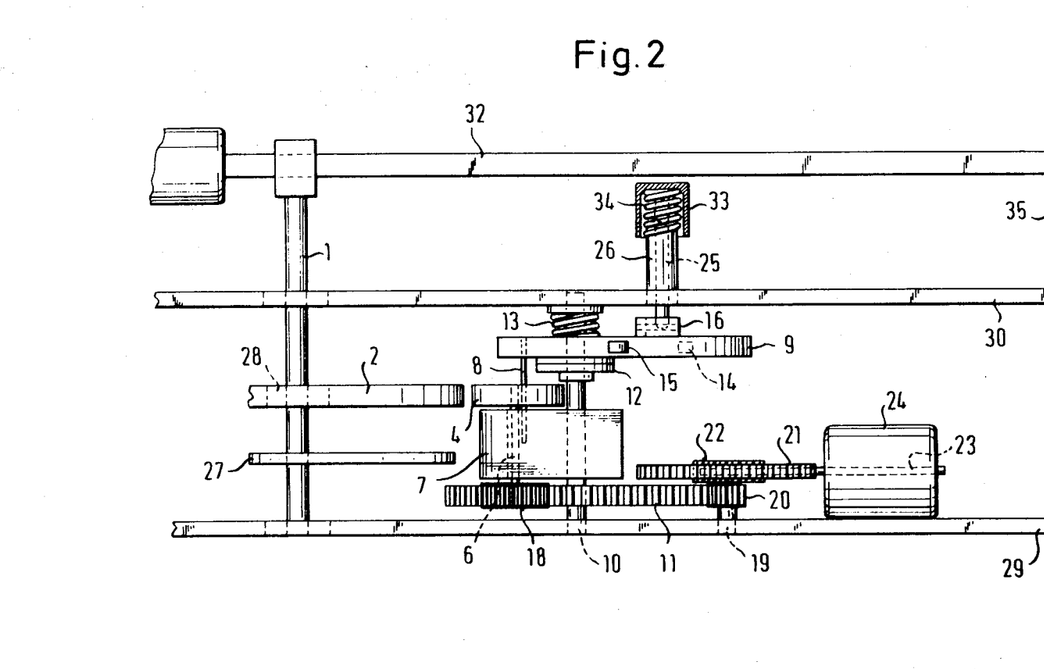
FIG. 2 is a side view of the embodiment of FIG. 1.

The sun wheel 11 is carried on a shaft 10. An element 9, which forms with the bar 7 a rotatable support means, is coupled to the shaft 10 by means of a slipping clutch 12 provided with a spring 13. By means of an entrainment pin 8 the bar 7 and the element 9 are non-rotatably connected to each other, the bar 7 being freely rotatably mounted on the shaft 10. The sun wheel 11 is, on the other hand, non-rotatably connected to the shaft 10. The shaft 10 is mounted in mounting elements 29, 30.

Figure 6:
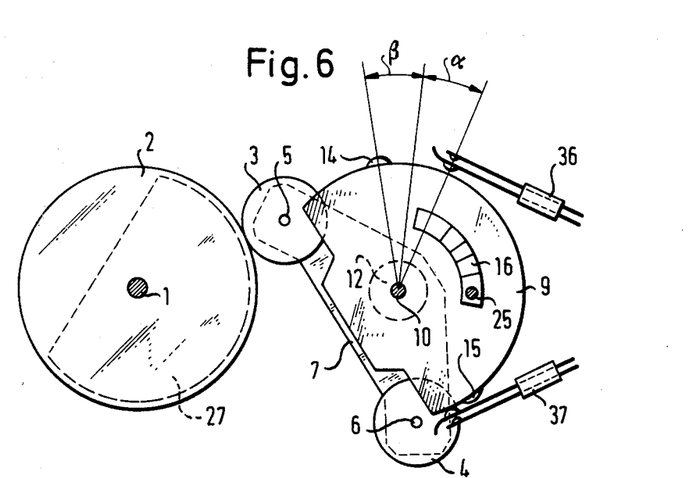
Figure 7:
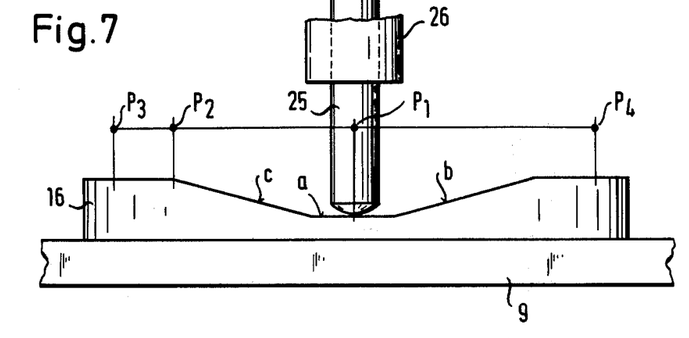
FIGS. 7, 8 and 9 show various positions of an actuating device for vertical control of the pick-up arm forming part of the embodiment of FIGS. 1 to 6.
Figure 8:
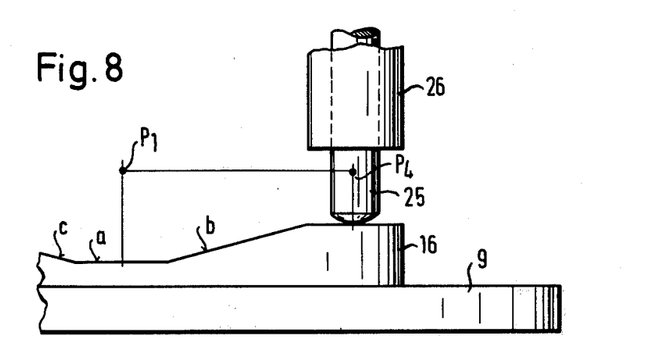
Figure 9:
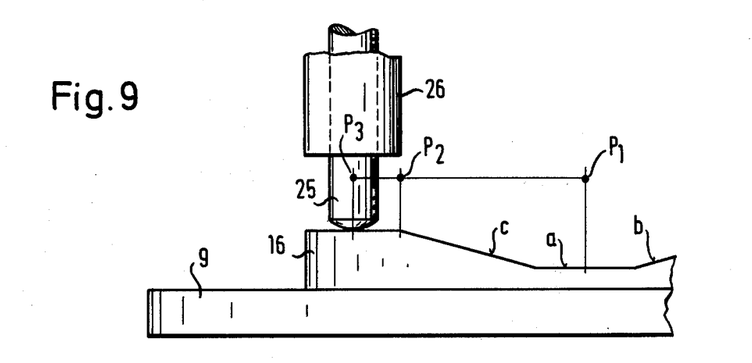

An actuating element 16, which is illustrated in greater detail in FIGS. 7, 8 and 9, and which is for control of vertical movement of a pick-up arm 32, is disposed on the element 9. Also provided on the element 9, more specifically on the outer periphery thereof, are actuating elements 14 and 15 in the form of projections which cooperate with witches 36, 37 (FIGS. 3 to 6).

As can be seen from FIG. 2, a support 35 is provided for the pick-up arm 32. The control device also includes a lifting device for controlling vertical movement of the pick-up arm 32. The lifting device comprises a guide element 26 in which a vertically moveable lifting rod 25 is guided. The lifting rod 25 is pressed by means of a spring 34 onto the upper surface of the actuating element 16, illustrated in greater detail in FIGS. 7 to 9. A pick-up arm supporting stand 33 forms an upper part of the lifting device.

FIGS. 1 to 6 illustrate a control device in which, disposed on the bar device 7, there are two drive wheels 3, 4, each of which can be brought into contact with the power take-off element 2. The drive wheels 3, 4 are non-rotatably mounted on the shafts 5, 6 carrying the planet wheels 17, 18. The mode of action of this control device will now be explained. When the pick-up arm 32 is to be moved to a certain position, a specific control command is given to the motor 24. The motor 24 then drives the worm gear 22, the driving motion of which is transmitted via the toothed wheel 21 and the bevel gear 20 to the sun wheel 11. Since the sun wheel 11 rests non-rotatably on the shaft 10, the slipping clutch 12, or an appropriate coupling part of the clutch, is rotated with it. The element 9 is coupled via the clutch 12 to the shaft 10 with the aid of the spring 13. When the sun wheel 11 rotates, the element 9 is therefore also rotated or swivelled along with it by means of the friction torque of the clutch 12. By means of the pin 8 the bar 7 is also rotated along with the sun wheel 11. The drive wheels 3 and 4, supported on the bar 7, are carried along during the rotary movement of the sun wheel, but do not rotate at this time about their own axes of rotation, i.e. the axes of the shafts 5 and 6. Eventually, one of the drive wheels 3, 4 comes into contact with the outer periphery of the power take-off element 2. Once this occurs, the drive wheel in question is pressed against the power take-off element 2 through the friction torque of the clutch 12. The element 9 and the bar 7 carry out no further rotary movement, as the friction torque of the clutch 12 has been overcome and the shaft 10 therefore continues to rotate without taking the element 9 with it. When this happens the rotary movement of the sun wheel 11 is transmitted to the planet wheels 17, 18 so that when the friction torque of the slipping clutch 12 has been overcome one of the drive wheels 3 or 4 is pressed with an appropriate contact pressure against the power take-off element 2 and is set in rotation, as a result of which the power take-off element and spindle 1 are rotated with it and the pick-up arm 32 carries out a horizontal swivelling movement.

When the motor 24 is switched off, or when the polarity of the motor voltage is reversed, which causes a brief standstill and a change in the direction of rotation of the motor 24, the planet wheels 17, 18 and thus the drive wheels 3 and 4, stop, while the contact pressure between one of the drive wheels 3, 4 and the power take-off element 2 is retained, which means that in this way there is ensured a well-defined stopping of the power take-off element 2 and the pick-up arm spindle 1. If the rotation of the motor 24 is in the opposite direction, the bar 7 and the element 9 are also rotated or swivelled in the opposite direction through the friction torque of the clutch 12. The rotation in the opposite direction can in this case be such that the control device takes up the position shown in FIG. 1.

During the rotary movement of the element 9, when one of the drive wheels 3, 4 is moving toward the power take-off element 2, the actuating element 16 is also rotated with the element 9. The lifting rod 25 follows a rising portion of a contact surface of the actuating device 16 and the supporting stand 33 of the pick-up arm, with the pick-up arm 32 itself, is raised. The tone arm is therefore moved into a raised position before one of the drive wheels 3, 4 sets the power take-off element 2 in motion. The mode of operation of the actuating element 16 is explained in more detail below with reference to FIGS. 7 to 9.

The friction torque of the slipping clutch 12 is much higher than the moment due to the friction which is produced at the lower end of the rod 25 by the spring 34.

The purpose of the coupling element 28, which is, for example, in the form of a slipping clutch, is to ensure limitation of the force between the pick-up arm 32 and the control device in the event that the pick-up arm is manually operated during automatic movement. This is to avoid unnecessary wear occurring between the drive wheel 3 or 4 and the power take-off element 2 in contact with it.

The coupling element 28 can be omitted, particularly when the contact pressure of the drive wheel 3 or 4 against the power take-off element 2 is low. In practice, this contact pressure is less than 30 p.

If there is no coupling element 28, the position indicating element 27 can also be omitted, for in that case position indication can be taken over by the power take-off element 2, for instance as described hereinbelow with reference to FIG. 13. The power take-off element 2 is then non-rotatably connected to the spindle 1 of the pick-up arm and can therefore be used for the position indication. The position indicating element 27 could also be omitted if the power take-off element 2 were non-rotatably positioned on the spindle 1 and slipping clutches were inserted in each case between the planet wheels 17 and 18 and the drive wheels 3 and 4.

When the motor 24 changes its direction of rotation the drive wheel 3 or 4 pressed against the motor take-off element 2 is uncoupled from it. This uncoupling takes place in such a way that the drive wheel 3 or 4 carries out no further rotary movements of any kind. This also applies where one of the drive wheels 3 or 4 is coupled to the power take-off element 2 in the way explained in the above description. This means that no disturbing torque of any kind is transmitted to the power takeoff element 2, which is something which would give rise to inadmissible inaccuracies, particularly at the time of uncoupling.

FIGS. 3 to 6 and FIGS. 7 to 9 illustrate various operating positions of the control device. The position shown in FIGS. 3 and 7 corresponds to a normal position $P_1$ of the control device. This normal position corresponds also to the position illustrated in FIG. 1. In this position the power take-off element 2, the position indicating element 27 (if present), the spindle 1 of the pick-up arm 32 and thus also the pick-up arm can move freely in the region outside the support of the pick-up arm. In other words, in this position the pick-up arm 32 can be operated manually and the user can swivel the pick-up arm into any desired position by hand.

Figure 3:
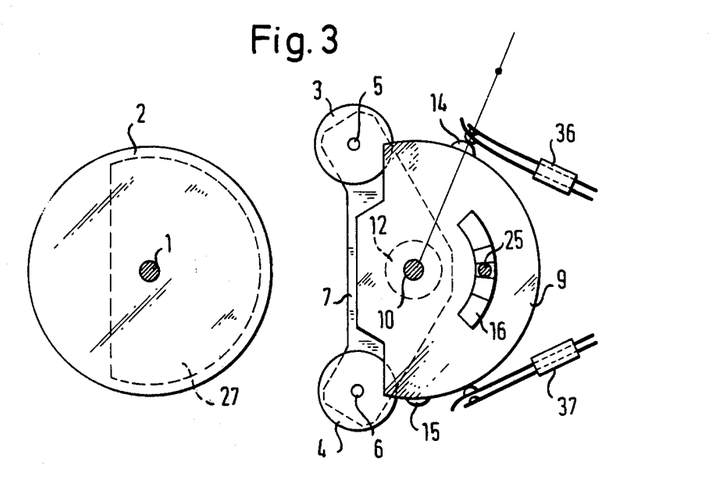
FIGS. 3, 4, 5 and 6 show various operating positions of the embodiment of FIGS. 1 and 2.

In the position $P_1$ the switch 36 is actuated by the actuating element 14 in such a way that the control device remains in the position illustrated in FIG. 3, i.e. the bar 7, the element 9 and the actuating element 16 located on the element 9 are in the normal position shown in FIGS. 3 and 7. The motor 24 is switched off and the pick-up arm 32 can move freely.

In its normal position the control device is ready to receive any of the starting commands: "pick-up arm forward movement"; "pick-up arm backward movement"; and "raise pick-up arm". The words "forward" and "backward" are used here to describe horizontal movement of the pick-up arm 32 in the record playing direction and in the direction opposite thereto, respectively.

Figure 4:
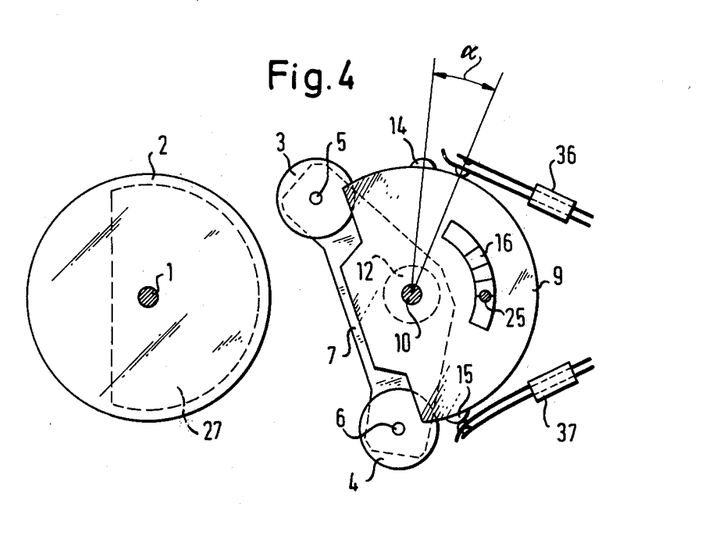

FIG. 4 shows the operating position in which the command "raise pick-up arm" has been given. It corresponds to the position $P_2$ in FIGS. 7 to 9. When this command is given, the element 9 and the bar 7 are rotated, as a result of rotation of the motor 24, to such an extent that the actuating element 15 actuates the switch 37. The element 9 has carried out a rotary movement through an angle $\alpha$ and has switched off the motor 24 by actuating the switch 37, which means that neither of the drive wheels 3 or 4 comes into contact with the power take-off element 2, but remain spaced from it.

Simultaneously with the rotation of the element 9 through the angle $\alpha$, the actuating element 16 is rotated from position $P_1$ to position $P_2$, so that the bottom end of the lifting rod 25 moves along an upward-sloping surface portion $c$, of the contact surface of the element 16, as a result of which the supporting stand 33 and the pick-up arm 32 are raised by a corresponding amount. Since the rotary movement stops at position $P_2$, the pick-up arm 32 remains in the corresponding raised position, for example raised from the record. Horizontal swivelling of the pick-up arm 32 does not take place, as neither of the drive wheels 3, 4 is in contact with the power take-off element 2.

If the polarity of the motor voltage is reversed by virtue of a control command, the element 9 moves together with the bar 7 through the same angle α, i.e. back from position P₂ to position P₁, where the actuating element 14 actuates the switch 36, the motor 24 is switched off, the control device returns to its normal position and the pick-up arm 32 is lowered.

Figure 5:
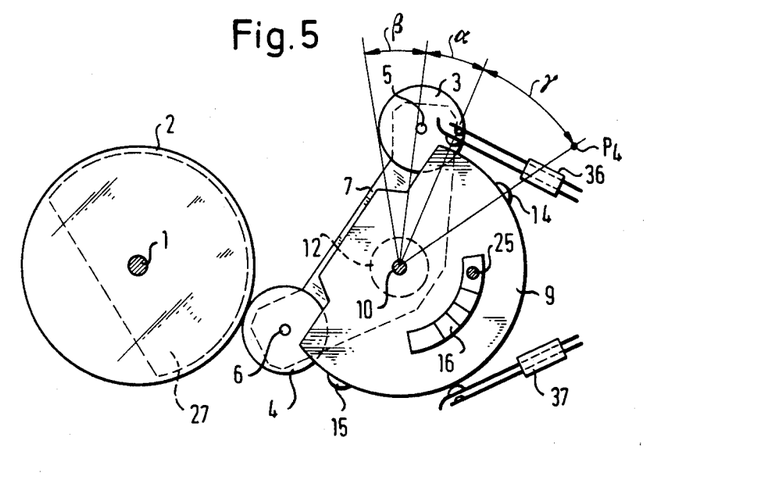

FIG. 5 shows the position of the control device in which the command "pick-up arm forward movement" has been given. As a result of rotary movement of the motor 24, the element 9 and the bar 7 rotate through an angle α, i.e. from the normal position P₁ to an operating position P₄. As can be seen particularly from FIGS. 7 and 8, the lifting rod 25 is also raised along a sloping portion b of the contact surface of the actuating element 16 and causes the supporting stand 33 and therefore the pick-up arm 32 to be raised. The drive wheel 4 is pressed with a specific force by means of the bar 7 against the power take-off element 2, this contact pressure being provided by the motor 24 and the friction torque of the slipping clutch 12 being overcome. In this case the planet wheels 17 and 18, and thus also the drive wheels 3 and 4, are set in rotation about the shafts 5 and 6, so that the pick-up arm 32 carries out a forward swivelling movement.

The pick-up arm 32 has therefore carried out the following sequence of movements:

1. Vertical movement, in which the pick-up arm 32 is raised from its support 35 or from the record;
2. End of the vertical movement, when the lifting rod has left the upward-sloping contact surface b (FIGS. 7, 8);
3. Horizontal movement as soon as the drive wheel 4 is lying with the necessary contact pressure, which overcomes the friction torque of the slipping clutch 12, against the power take-off element 2. The pick-up arm 32, then carries out a horizontal forward movement over the record towards the end of the record.

Should there now occur at the end of the record or at another specific part of the record a new control command, e.g. "end of record", or a manual control command "pick-up arm stop", the polarity of the motor 24 is reversed. The element 9 and the bar 7 are then returned from the working position P₄ to the normal position P₁, in which the actuating element 14 actuates the switch 36, when switches off the motor 24. The pick-up arm 32 is then lowered again, because the lifting rod 25 has returned in the meantime along the contact surface b to the surface portion a of the actuating element 16.

FIG. 6 shows the operating position P₃ of the control device after the command "pick-up arm backward movement" has been given. As a result of appropriate rotary movement of the motor 24, the element 9 and the bar 7 carry out a rotary movement through an angle α+β from the normal position P₁ to the operating position P₃. The actuating element 16 on the element 9 also moves through the angle α+β, so that the lifting rod 25 is raised along the contact surface portion c, and thus the supporting stand 33 of the pick-up arm and the pick-up arm 32 itself are also raised. In the operating position P₃ the drive wheel 3 is pressed against the power take-off element 2 and then, when the contact pressure has overcome the friction torque of the slipping clutch 12, set in rotation, so that the spindle 1 is rotated such that the pick-up arm 32 carries out a horizontal backward movement. During this horizontal backward movement the pick-up arm 32 moves towards the beginning of the record. Should there now be a control command, e.g. "record start" or "pick-up arm stop", the polarity of the motor 24 is reversed and the element 9 and the bar 7 are returned from position P₃ to the normal position P₁. The pick-up arm 32 is then in its lowered position again and the motor 24 is switched off by the actuating element 14 via the switch 36.

FIG. 9 shows the position of the lifting rod 25 of the lifting device when the element 9 is in the operating position P₃.

The control commands "record start", "record end", "pick-up arm stop" etc., which are additionally required for control of the pick-up arm 32 and which are derived from the position of the pick-up arm, are produced by the position indicating element 27 illustrated in FIGS. 1 and 2. Position indication can take place optically, magnetically, inductively or mechanically. If the position indication is mechanical, it must be ensured by means of the bar 7 that in the normal position P₁ of the control device no mechanical friction torque acts upon the position indicating element 27.

FIGS. 10 to 16 show embodiments which differ from that described above in that only one drive wheel 3, which can be pressed against the power take-off element 2, is provided. In these embodiments, as in that described above, the power take-off element 2 is carried by the spindle 1 of the pick-up arm, while the drive wheel 3 is mounted with the shaft 5 on the bar 7. Disposed non-rotatably on the shaft 5 on the lower side of the bar 7 is the planet wheel 17 which meshes with the sun wheel 11.

Figure 10:
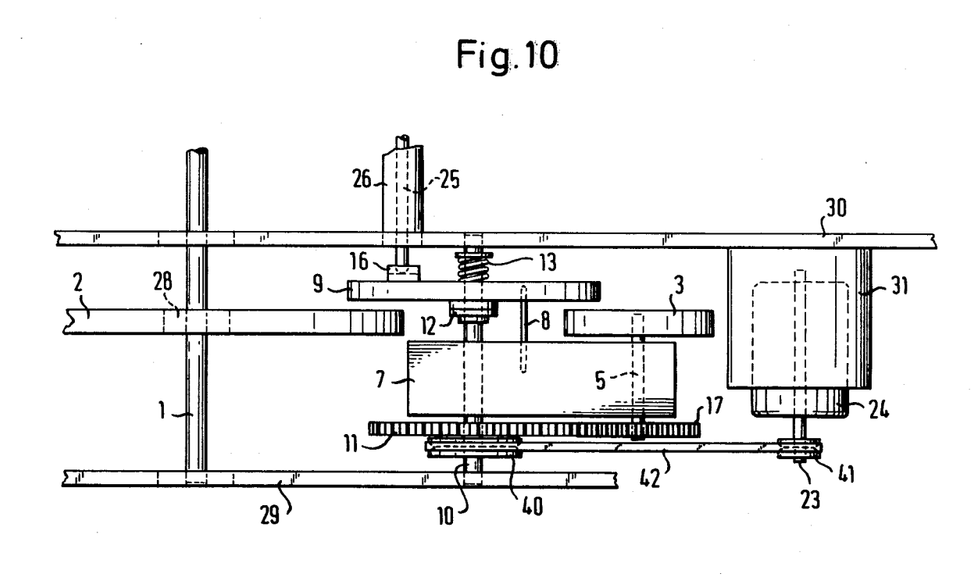
FIG. 10 is a side view of a second embodiment.
Figure 11:
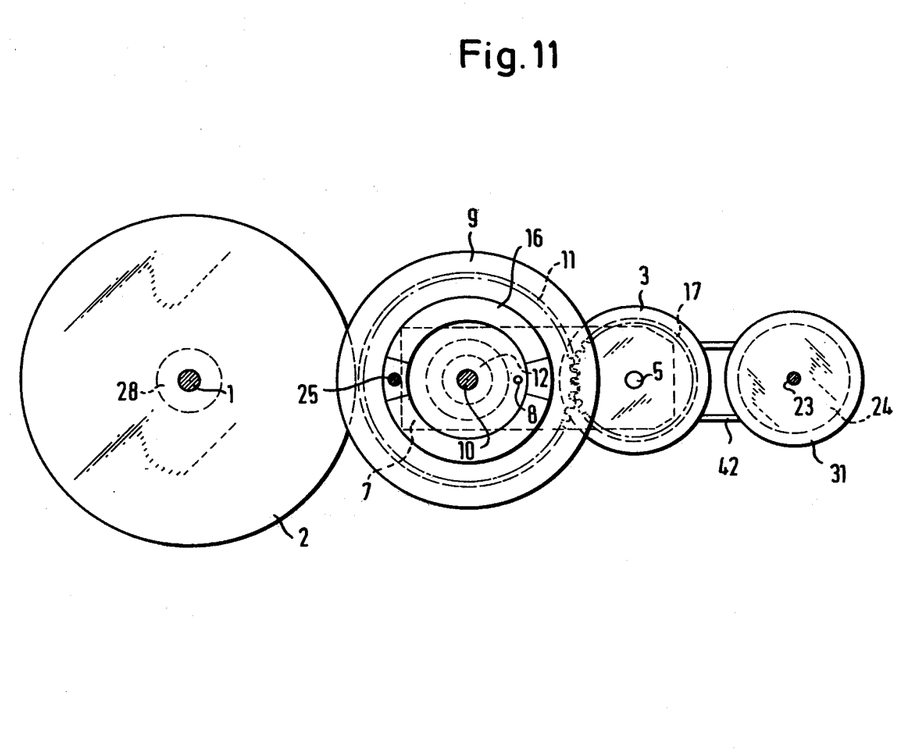
FIG. 11 is a plan view of the embodiment of FIG. 10.

The sun wheel 11 is carried non-rotatably on the shaft 10, which further has a belt pulley 40 non-rotatably disposed on it. The motor 24 is carried in a motor carrier element 31 and, by means of a belt pulley 41 and a belt 42, drives the belt pulley 40 which is carried on the shaft 10.

The element 9 is coupled via the slipping clutch 12 with the spring 13 to the shaft 10. The entrainment pin 8 connects the bar 7 with the element 9. Disposed on the element 9 is the actuating element 16 for vertical control of the lifting rod 25, which is guided in the guide element 26 and thus acts upon the pick-up arm, which is not shown. The individual elements provided for the control device are disposed between the mounting elements 29 and 30 and are essentially mounted in these, the shaft 10 in particular being supported in the elements 29 and 30.

The mode of operation of the embodiment illustrated in FIGS. 10 and 11 is essentially the same as that of the embodiment of FIGS. 1 to 9, i.e. the drive wheel 3 can be moved from the normal position shown in FIGS. 10 and 11 to an operating position which, depending on the control command, corresponds to one of operating positions P₂, P₃ and P₄ shown in FIGS. 3 to 9. At the same time, in a similar way to that described with reference to FIGS. 7 to 9, and depending on the operating position of the drive wheel 3 at the time, the lifting rod 25, and thus also the pick-up arm 32, is raised or lowered through the surface portions a, b and c of the contact surface of the actuating element 16.

Figure 12:
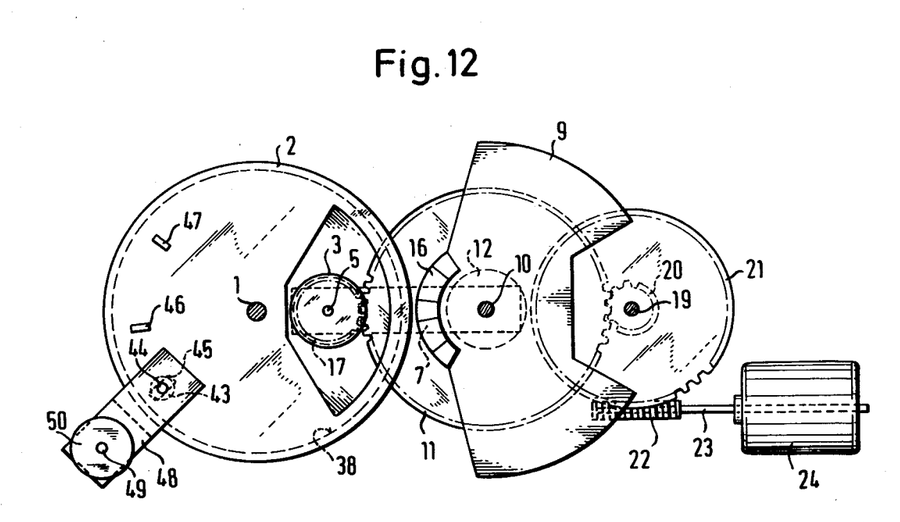
FIG. 12 is a plan view of a third embodiment.
Figure 13:
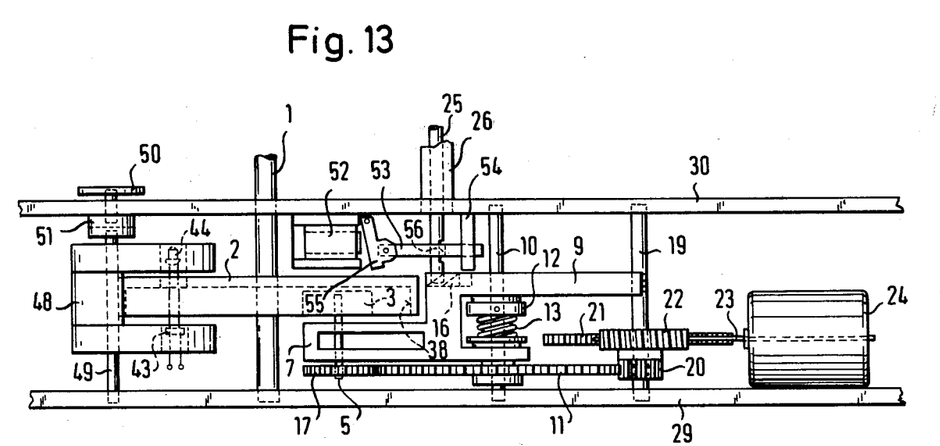
FIG. 13 is a side view of the embodiment of FIG. 12.

In the embodiment of FIGS. 12 and 13 the single drive wheel 3 is arranged to be pressed against an internal surface 38 of the power take-off element 2 rather than against the periphery thereof, as in the preceding embodiments. The function of this embodiment is essentially the same as that of the two preceding embodiments.

FIGS. 12 and 13 show another possible form of position indicating device. This position indicating device contains a photosensor 43, in the form of, say, a photoresistor, and a light source 44, the two being disposed opposite each other so that the light from the light source 44 can strike the photosensor 43. Furthermore, the power take-off element 2 forms part of the position indicating device and contains slots 45, 46, 47. The slots 45, 46, 47 allow light from the light source 44 to strike the photosensor 43 when they are aligned with the light source 44 and the photosensor 43. Otherwise the light from the light source 44 is prevented from reaching the photosensor 43 by the power take-off element 2.

The photosensor 43 and the light source 44 are disposed in a mounting clip 48, which can be swivelled with the aid of a wheel 50 about a spindle 49.

Slight corrections to the touching down point of the pick-up arm can be made by twisting the clip 48. In order to permit these slight corrections to be made accurately, a reduction gear element 51 is provided between the wheel 50 and the spindle 49 as shown in FIG. 13.

As can also be seen in particular from FIG. 13, the rotatable support means comprising the bar 7 and the element 9 can be formed in one piece. In this case the slipping clutch 12 is disposed in such a way that the height of the whole arrangement is relatively small. The member forming the bar 7 and the element 9 is coupled by means of the slipping clutch 12 to the shaft 10. The spring 13 serves to set the friction torque of the slipping clutch 12. The shaft 10, as in the preceding embodiments, is mounted in the retaining elements 29 and 30. The driving power of the motor 24, as in the embodiment of FIGS. 1 and 2, is transmitted to the rotatable support means constituted by the bar 7 and the element 9, and to the drive wheel 3.

In the embodiment of FIGS. 12 and 13, as can be seen from FIG. 13, a blocking device is provided for the lifting device that controls vertical movement of the pick-up arm. The block device comprises an electromagnet 52, a pawl 53 and a pawl guide element 54. This blocking device ensures that when the rotatable support means constituted by the bar 7 and the element 9 changes from the operating position P₃ to the operating position P₄ (FIGS. 5 and 6), or vice versa, the pick-up arm remains in its raised position and is not lowered. If a control command is given to the record player to the effect that the rotatable support means should move from the operating position P₃ into the operating position P₄, or vice versa, the electromagnet 52 is activated at the same time. In this way an armature 55 is attracted by the electromagnet 52 and the pawl 53, which is hinged on the armature 55, is locked in a recess 56 of the lifting rod 25 of the lifting device. In this way the lifting rod 25 is prevented from lowering and the pick-up arm is thus prevented from being lowered to the surface of the record while the change of direction described continues.

Of course, it is also possible to heavily damp the movement of the lifting rod 25 without using the block device described, so that in passing through the area from position P₃ to position P₄ in a relatively short time the lifting rod 25, and thus the pick-up arm 32, is lowered by only a negligible amount.

Figure 14:
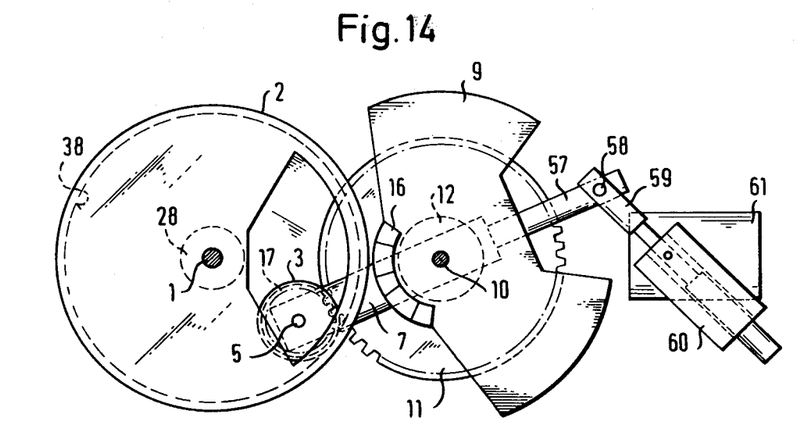
FIGS. 14 and 15 are plan views of a fourth embodiment in two different positions.
Figure 15:
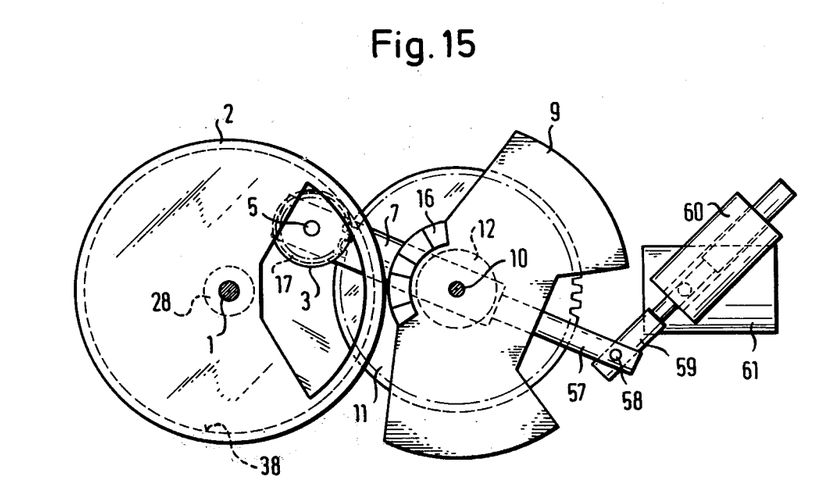

In the embodiment illustrated in FIGS. 14 and 15, in order to avoid lowering of the pick-up arm 32 while a change of direction is going on, the drive wheel 3 is pressed against an internal surface 38 of the power take-off element 2. Unlike the embodiment described above, in the embodiment of FIGS. 14 and 15 the rotatable support means constituted by the bar 7 and the element 9 is locked in the appropriate operating position before the change of direction. A locking device for accomplishing this function comprises an electromagnet 60 which is pivotally mounted on a base element 61. An armature 59 of the electromagnet 60 is hinged by means of a hinge 58 to an extension piece 57 of the bar 7 of the rotatable support means. An advantage of this embodiment is that changes in the direction of movement of the pick-up arm can take place without any time delay.

The mode of operation of this embodiment is as follows. If the record player receives a control command for reversal of the direction of movement of the pick-up arm, the electromagnet 60 is energised. At the same time the polarity of the voltage applied to the motor 24, which for the sake of simplicity is not shown in FIGS. 14 and 15, is also changed. The armature 59 of the electromagnet 60 presses against the extension piece 57 of the bar 7 and this causes the drive wheel 3 to be pressed further against the internal surface 38 of the power takeoff element 2, so that the contrarotating movement of the drive wheel 3 is converted into a swivelling movement of the pick-up arm in the opposite direction. The rotatable support means constituted by the bar 7 and the element 9 remains in position, for example in the position shown in FIG. 14, until such time as a new control command switches off the lifting electromagnet 60. When the electromagnet 60 is switched off, the drive wheel 3 and the rotatable support means move back to the normal position. In FIG. 15 the drive gear 3 is shown locked in the other operating position by the electromagnet 60.

Figure 16:
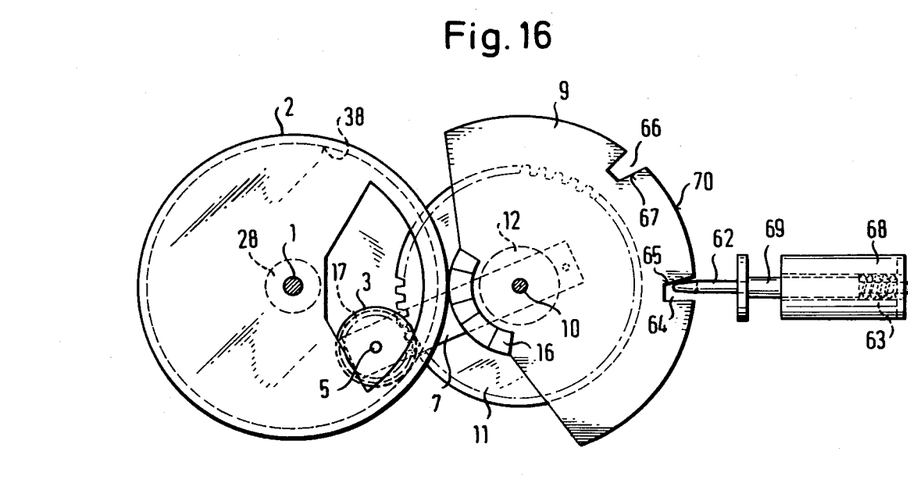
FIG. 16 is a plan view of a fifth embodiment.

The embodiment illustrated in FIG. 16 comprises an electromagnet 68 which works as follows:

When the drive wheel 3, the bar 7 and the element 9 are in the position illustrated in FIG. 16, a pawl 62, which is fixed on an armature 69 of the magnet 68, is pushed by the thrust of a spring 63 into a recess 64 of the element 9. The thrust of the spring 63 presses the pawl 62 onto a sloping surface 65 of the element 9 and in this way causes the drive wheel 3 to be pressed against the power takeoff element 2. The drive wheel 3 remains pressed against the element 2 until such time as the electromagnet 68 is energised by a control command, as a result of which the pawl 62 is withdrawn from the recess 64 and the element 9 is released.

If the control device at the same time received a command "Return rotatable support means to normal position" (pick-up arm lowered), the element 9 or the recess 64 swivels or rotates out of the engaging range of the pawl 62. The electromagnet 68 is then de-energised and the pawl 62 rests on a smooth sliding surface 70 of the element 9, so that the rotatable support means can move into the normal position.

The method of operation is the same with the reverse direction of rotation in which the pawl 62 is pressed against an inclined surface 67 of a recess 66. The advantage of this is that the electromagnet 68 is energised only for a brief period of time, as the pawl 62 is effective through the thrust of the spring 63.

The invention can be embodied in other ways than those described above by ways of example. For instance, the or each planet wheel 17, 18 can be arranged to come into contact with the power take-off element 2 and therefore perform the function of the associated drive wheel 3 and 4, whereby the drive wheels can be omitted.

I claim:

1. A control device for a pick-up arm of a record player, said device comprising:
   a. a power take-off element (2) disposed on a vertical spindle of a pick-up arm;
   b. a shaft of rotation;
   c. a sun wheel mounted on said shaft for rotation therewith;
   d. drive means for rotating said sun wheel;
   e. a rotatable support means consisting of an element and a bar non-rotatably connected to each other with said bar being mounted on said shaft and rotatable independently thereof;
   f. a clutch mounted on said shaft and connecting said element to said shaft to rotation therewith and thereby serving to rotate said bar with said element;
   g. at least one planet wheel means in engagement with said sun wheel (11) and mounted to said rotatable support means about said shaft of rotation whereby, on rotation of said sun wheel (11), said rotatable support means with said planet wheel means mounted thereon will also rotate until said planet wheel means is brought into contact with said power take-off element (2) whereupon said clutch (12) will slip and said planet wheel means will rotate about its said axis of rotation and, through frictional contact with said power take-off element (2), will rotate said vertical spindle and thus swivel said pick-up arm; and
   h. lifting means responsive to said rotation of said rotatable support means to raise said pick-up arm before said planet wheel means is brought into contact with said power take-off element.

2. The control device of claim 1, comprising two said planet wheel means of which a respective one will contact said power take-off element in accordance with whether said sun wheel is rotated in one direction or the other to swivel said pick-up arm in one direction or the other.

3. The control device of claim 1, wherein said planet wheel means comprise a single planet which engages said sun wheel (11) and is positioned to be brought into frictional contact with said power take-off element (2) upon rotation of said rotatable support means.

4. The control device of claim 1, wherein said planet wheel means comprises a shaft (5, 6), a planet wheel (17, 18) disposed on said shaft in engagement with said sun wheel (11), and a drive wheel (3, 4) disposed on said shaft, non-rotatably with respect to said planet wheel, and positioned to be brought into frictional contact with said power take-off element (2) upon rotation of said rotatable support means.

5. The control device of claim 1, wherein said rotatable support means comprises a single member.

6. The control device of claim 1, wherein said power take-off element (2) has an outer circular periphery and said planet wheel means is adapted to be brought into frictional contact with said periphery.

7. The control device of claim 1, wherein said power take-off element (2) has an inner surface (38) and said planet wheel means is adapted to be brought into frictional contact with said inner surface.

8. The control device of claim 1, wherein said drive means for rotating said sun wheel comprises a motor (24), electrical switches (36, 37) are provided for controlling operation of said motor, and actuating elements (14, 15) for said switches are provided on said rotatable support 9. The control device of claim 1, including a position indicating device (43 to 47) adapted to indicate when the pick-up arm has taken up certain positions and to supply output signals for controlling operation of the control device.

10. The control device of claim 1, wherein said sun wheel (11) and planet wheel means comprises toothed wheels.

11. The control device of claim 1, wherein said lifting means comprises an actuating element (16) disposed on said rotatable support means and a lifting device (25, 26, 33) actuated by said actuating element (16) upon rotation of said rotatable support means to control vertical movement of the pick-up arm.

12. The control device of claim 1, wherein said rotatable support means comprises two separate parts which are non-rotatably connected together, a first said part (7) being in the form of a bar and carrying said planet wheel means and a second said part (9) carrying said actuating element.

13. The control device of claim 11, including a blocking device (52 to 56) adapted to cooperate with said lifting device (25, 26, 33) in such a way that if a change in the direction of swivel is imparted to said pick-up arm, said lifting device will cause said pick-up arm to remain raised during an associated rotary movement of said rotatable support means (7, 9).

14. The control device of claim 11, including a locking device (57 to 61) which comprises a pivotable magnet (60) adapted to hold said rotatable support means (7, 9) against rotation such that said pick-up arm can change its direction of swivel and in so doing remain raised.

15. The control device of claim 4, including an engagement device (62 to 70) adapted to engage said rotatable support means (7, 9) in such a way that said planet wheel means is held pressed against said power take-off element (2).

16. The control device of claim 11 wherein said actuating element (16) comprises a control surface composed of surface portions (*a, b, c*) having different levels and inclinations, said lifting device being adapted to follow said control surface.

* * * * *